United States Patent
Sharony

(10) Patent No.: US 7,069,024 B2
(45) Date of Patent: Jun. 27, 2006

(54) SYSTEM AND METHOD FOR DETERMINING LOCATION OF ROGUE WIRELESS ACCESS POINT

(75) Inventor: Jacob Sharony, Dix Hills, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 472 days.

(21) Appl. No.: 10/699,257

(22) Filed: Oct. 31, 2003

(65) Prior Publication Data
US 2005/0113090 A1 May 26, 2005

(51) Int. Cl.
*H04Q 7/20* (2006.01)
(52) U.S. Cl. .............................. 455/456.1; 455/404.2; 455/115.1
(58) Field of Classification Search ............... 455/436, 455/456.1, 456.3, 456.5, 456.6, 446, 67.11, 455/403, 404.2, 115.1–3, 422.1, 424
See application file for complete search history.

(56) References Cited

U.S. PATENT DOCUMENTS

| | | | |
|---|---|---|---|
| 6,754,488 B1 * | 6/2004 | Won et al. .................. | 455/424 |
| 2003/0186679 A1 * | 10/2003 | Challener et al. ............ | 455/410 |
| 2004/0023640 A1 * | 2/2004 | Ballai ......................... | 455/411 |
| 2004/0137915 A1 * | 7/2004 | Diener et al. ............. | 455/456.1 |
| 2004/0198392 A1 * | 10/2004 | Harvey et al. ............ | 455/456.1 |
| 2004/0252837 A1 * | 12/2004 | Harvey et al. ............... | 380/270 |
| 2005/0030929 A1 * | 2/2005 | Swier et al. ................. | 370/338 |
| 2005/0114649 A1 * | 5/2005 | Challener et al. ........... | 713/155 |

* cited by examiner

*Primary Examiner*—CongVan Tran
(74) *Attorney, Agent, or Firm*—Fay Kaplun & Marcin, LLP

(57) ABSTRACT

Described are a method and system for determining a location of an unauthorized wireless access point ("AP") accessing a communication network. Upon notification of existence of the unauthorized AP, at least three authorized APs of the communication network initiate tracking a beacon of the unauthorized AP. A tracking data record is generated partially based on information obtained during the tracking of the tracking beacon. The tracking record may include a location of each of the authorized APs and at least one of (i) a first strength data corresponding to a strength of the tracking beacon as measured by each of the authorized APs and (ii) a first time data corresponding to a time period that it takes for the tracking beacon to arrive at each of the authorized APs. The location of the unauthorized AP is determined as a function of at least one of (i) the tracking record and (ii) a calibrating record. The calibrating record may include (a) at least one of a second strength data corresponding to a strength of a calibrating beacon as transmitted from a predetermined location within the communication network and received by each of the authorized APs and a second time data corresponding to a time period that it takes for the calibrating beacon to arrive from the predetermined location to each of the authorized AP, (b) the predetermined location and (c) the location of each of the authorized AP.

19 Claims, 2 Drawing Sheets

SYSTEM AND METHOD FOR DETERMINING LOCATION OF ROGUE WIRELESS ACCESS POINT

BACKGROUND INFORMATION

With the proliferation of wireless networks, many organizations (e.g., enterprises, universities, hospitals, etc.) have installed or are planning to install wireless networks in additional or, in alternative, to wired networks. Such wireless networks are believed to increase efficiency and productivity. However, one of disadvantages of wireless networks is security of such networks. Unlike wired networks, which are usually enclosed in secure and protected premises of the organization, elements of wireless networks (e.g., wireless access points ["AP"]) may be scattered throughout the organization's premises.

One major threat to wireless network security is a rogue AP. A rogue AP is an unauthorized AP that allows a third party to access the organization's network without a permission of the organization. For instance, a rogue AP may be installed with malicious intentions (e.g., to obtain access to the organization's data stored on the network). Another example of utilization of a rogue AP is a less threatening scenario: a member of the organization (e.g., an employee) may connect a rogue AP to the organization's network without a proper authorization. In other words, the employee may be authorized to use the organization's network, but the use of that particular AP may be unauthorized. This situation may occur, for example, if the employee decided to use his personal AP for more convenient access to the organization's network. If the AP is not properly configured to provide a secure access to authorized users, then unauthorized users using compatible hardware may also gain access to the network. This may be of particular concern when the AP covers a physical area outside of the organization's premises. Then, unauthorized users may access the network without physically entering the organization's premises.

To address the threat of a rogue AP, the network administrator monitors the traffic on the network. Once a rogue AP is detected, however, the problem is to locate this rogue AP so that it can be removed. Finding the rogue AP may be a difficult task as the AP may be hidden anywhere in the organization's premises. For example, the rogue AP may be hidden under ceilings or behind walls. There is, therefore, a need for a system and method that determines a particular location of a rogue AP with great accuracy (e.g., within two feet) within the organization's premises.

SUMMARY OF THE INVENTION

Described are a method and system for determining a location of an unauthorized wireless access point ("AP") accessing a communication network. Upon notification of existence of the unauthorized AP, at least three authorized APs of the communication network initiate tracking a beacon of the unauthorized AP.

A tracking data record is generated partially based on information obtained during the tracking of the tracking beacon. The tracking record may include a location of each of the authorized APs and at least one of (i) a first strength data corresponding to a strength of the tracking beacon as measured by each of the authorized APs and (ii) a first time data corresponding to a time period that it takes for the tracking beacon to arrive at each of the authorized APs. The location of the unauthorized AP is determined as a function of at least one of (i) the tracking record and (ii) a calibrating record. The calibrating record may include (a) at least one of a second strength data corresponding to a strength of a calibrating beacon as transmitted from a predetermined location within the communication network and received by each of the authorized APs and a second time data corresponding to a time period that it takes for the calibrating beacon to arrive from the predetermined location to each of the authorized AP, (b) the predetermined location and (c) the location of each of the authorized AP.

DETAILED DESCRIPTION

Figure 1:
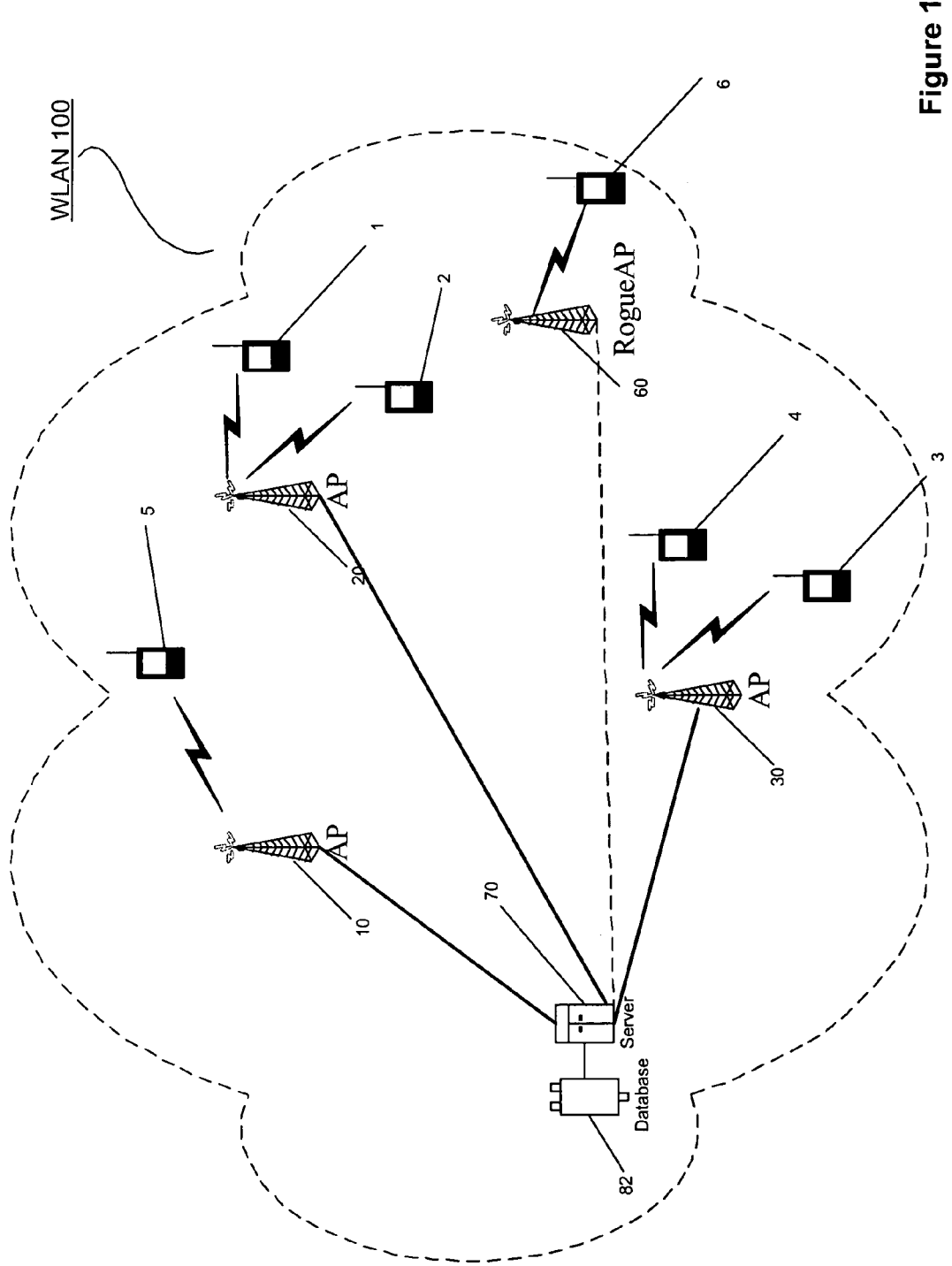
FIG. 1 shows an exemplary embodiment of a system according to the present invention.

FIG. 1 shows an exemplary embodiment of a wireless network and, in particular, a wireless local area network ("WLAN") 100 according to the present invention. The WLAN 100 may include a plurality of authorized access points ("AP"s) 10, 20 and 30. The WLAN 100 may also include a plurality of authorized mobile units MUs (e.g., MU 1–5) and at least one server (e.g., a server 70). The APs 10–30 may be connected directly to the server 70. The WLAN 100 includes a database 82 storing data regarding authorized devices, authorized users, locations of the WLAN's assets, etc. The database 82 may also include identification information about devices that are specifically prohibited from accessing the WLAN 100.

The MU 1 accesses various assets of the WLAN 100 via the APs 10–30. Depending where the MU 1 is located at a particular time, the MU 1 may access the WLAN 100 via the closest AP. Every AP periodically transmits beacon signals which may be used to determine the closest AP. For example, the MU 1 may determine that the AP 20 is the closest AP. Therefore, the MU 1 establishes wireless communication with the WLAN 100 via the AP 20, rather than via the AP 10 or the AP 30.

If the user of the MU 1 attempts to access the server 70, the MU 1 first waits for a communication channel to the AP 20 to be available. Once the communication channel is available, the MU 1 transmits an authentication message to the AP 20 requesting an access to the WLAN 100. The authentication message may contain user's identification data (e.g., login name and password). When the AP 20 receives the authentication message from the MU 1, it initiates an authentication process. The authentication process may include verification of the identification data received from the user against the data stored in the database 82. If the identification data is not verified, then the MU 1 is denied access to the WLAN 100. However, if the identification data is verified, then the AP 20 transmits a corresponding response authorizing the MU 1 to access the WLAN 100. Once the MU 1 receives authorization, the MU 1 may access the WLAN 100 via the AP 20. For example, the user of the MU 1 may then access the server 70.

An unauthorized user may desire to obtain access to the WLAN 100, and in particular, to the server 70 utilizing an unauthorized, or rogue, AP 60. The rogue AP 60 may be configured to check its resident database before approving an access to the WLAN 100. The resident database of the AP 60, configured by the unauthorized user may contain, for example, a login name and/or password of the unauthorized user. Alternatively, the rogue AP 60 may be configured to approve an access without verifying the identification data from the authentication message. The rogue AP 60 may then provide access to the WLAN 100 by a rogue MU 6.

The unauthorized user may use the MU 6 to access the server 70 via the rogue AP 60. The MU 6 transmits an authentication message to the rogue AP 60, which is configured by the unauthorized user to allow the MU 6 to access the WLAN 100. The unauthorized user may gain access to the server 70 by logging in in the same manner as the authorized user.

Figure 2:
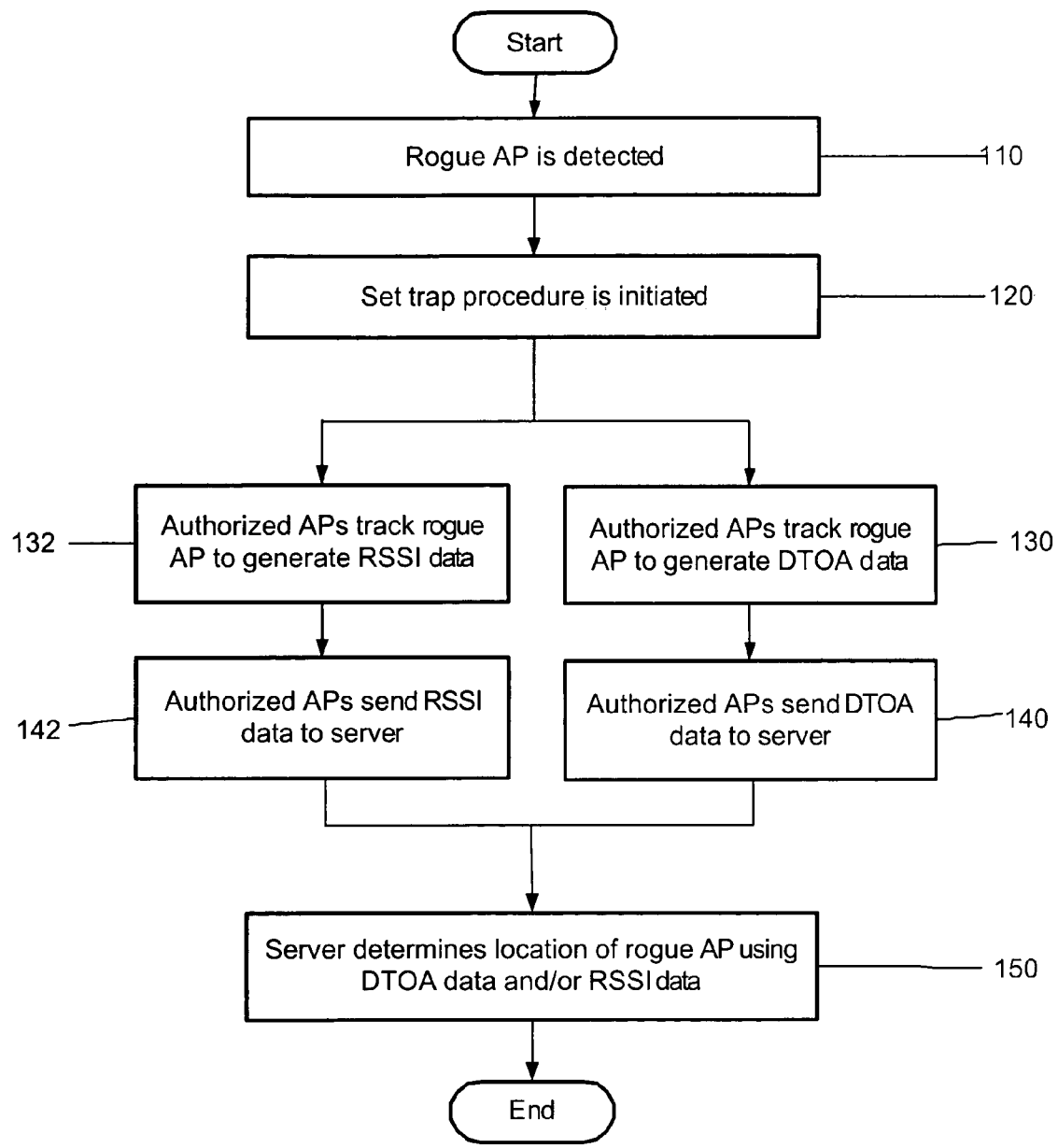
FIG. 2 shows an exemplary embodiment of a method according to the present invention.

FIG. 2 shows a method according to an exemplary embodiment of the present invention utilized to determine the location of the rogue AP 60 with great accuracy (e.g., within two feet). Such location, or a specific area within which the rough AP 60 may be located, may be determined in relationship to another know object or location (e.g., within a three feet radius of a printer in Mr. Smith's Alex's office; in a reception area—near a door, etc.). The method is described with reference to FIG. 1. Those skilled in the art will understand that other systems having varying configurations, for example, different numbers of APs, WLANs or MUs may be used to implement the exemplary method.

In step 110, the rogue AP 60 is detected and identified as an unauthorized AP. A person skilled in the art will understand that the detection of the rogue AP 60 may be accomplished in a variety of ways. For example, the network administrator may monitor the traffic on the WLAN 100 using a sniffer program to detect any rogue APs.

Another method of detecting the rogue AP 60 may involve beacon signals. These beacons are periodically transmitted by every AP. The beacon signal may contain information including a MAC address of the transmitting AP, a service set identification ("SSID"), supported data rates, etc. The MAC address is an identifier assigned by the manufacturer and hence it is utilized as a manufacturer identification of the AP. The SSID identifies a virtual local area network ("VLAN") that is served by a particular WLAN. The VLAN may encompass a single WLAN (e.g., WLAN 100) or a plurality of WLANs. Conversely, the WLAN 100 may serve a plurality of VLANs and a particular AP beacon, from an AP associated with the WLAN 100, contain a list of SSIDs.

Based on the information stored in the beacon signals, a determination is made as to whether the beacon signal received is from an authorized or unauthorized AP. This may be determined based on two exemplary criteria. These criteria may be used alternatively or in conjunction to determine if the particular AP is unauthorized. Those skilled in the art would understand that there may be a plurality of other criteria used to make such determination.

The first exemplary criteria is based upon a verification of the manufacturer identification of the MAC address of the transmitting AP. The data stored in the beacon signal is compared to the data stored on the database 82, which contains data of the authorized APs.

The second exemplary criteria is based upon a verification using the SSID stored in the beacon signal against the authorized SSIDs stored in the database 82. If this criteria is utilized, the network administrator or another authorized user may generate a list of valid SSIDs. Therefore, if the rogue AP 60 is manufactured by an authorized manufacturer but the SSID in the beacon is invalid, then the presence of the rogue AP 60 is detected. Those skilled in the art will understand that the network administrator may also insert other codes into the beacons of the authorized APs that may be used to identify authorized/unauthorized APs.

In step 120, once a determination is made that the beacon is received from the unauthorized rogue AP 60, a "set trap" procedure is initiated. The "set trap" procedure creates a data record of information that may be useful for tracking the rogue AP 60. Such a data record may include, for example, the MAC and SSID addresses of the AP 10, as well as the MAC and SSID addresses of the rogue AP 60. The data record may also include the time and date when the data record was created and the criteria used to detect the rogue AP 60 (e.g., unverified manufacturers MAC address, no matching SSID, etc.).

After the "set trap" procedure has been initiated, AP's that are situated within a predetermined proximity to the rogue AP 60 (i.e., those AP's that detected the rogue AP) are instructed to track beacon signals emanating from the rogue AP 60. For instance, assuming that all APs 10–30 detect the rogue AP 60, all APs 10–30 also track the signals of the detected rogue AP 60.

The physical location of the rogue AP 60 may be determine by utilizing Received Signal Strength Indication ("RSSI" measured in dBm) data and/or Difference in Time Of Arrival ("DTOA" measured in ns) data as discussed in more detail below. While either the DTOA data or the RSSI data alone may be sufficient to calculate the location of the rogue AP 60. It is preferred that both of the sets of data are used in order to provide the most accurate calculation of the rogue AP 60's location.

Prior to the set trap procedure, a calibration procedure needs to be performed, if RSSI is to be utilized. The calibration procedure is optional for DTOA. The calibration procedure may be accomplished by placing a computing device (e.g., MU 4 or any AP) at a number of particular locations within the WLAN 100 (i.e., a landmark). The landmark may be a reception area, a publication room, a storage room, a server room, etc. During the calibration procedure calibration data, such as shown below, is generated.

| Calibration Table | | | | | |
|---|---|---|---|---|---|
| | AP 10 | | AP 20 | | AP 30 |
| Reception area | −10 dBm | 4 ns | −20 dBm | 3 ns | −30 dBm 2 ns |
| Publication room | −40 dBm | 1 ns | −20 dBm | 3 ns | −20 dBm 3 ns |
| Storage room | −30 dBm | 2 ns | −10 dBm | 4 ns | −20 dBm 3 ns |
| Server room | −20 dBm | 3 ns | −30 dBm | 2 ns | −10 dBm 4 ns |

The Calibration Table shows exemplary calibration data including the RSSI data and the DTOA data as recorded by each AP 10–30 for four different landmarks within the WLAN 100. In particular, each AP 10–30 obtains different data readings because of the different distance between each AP 10–30 and the MU 4. The calibration process is preferably repeated a few times in order to obtain accurate calibration data.

In step 132, the APs 10–30 may record and analyze the beacon signals in order to generate the RSSI data. That RSSI data may be then transmitted to the server 70 for further analysis (step 140). Alternatively, the RSSI data may be stored by the corresponding AP and periodically retrieved by the server 70 or automatically forwarded to the server 70. The system for handling communication of this RSSI data may be implemented with the common simple network management protocol ("SNMP") or a similar protocol.

In order to determine the location of the rogue AP 60 using the RSSI data, preferably, at least three reference points (i.e., APs 10–30) are used. Three reference points (e.g., APs 10–30) represent a minimum number of locations inside a three-dimensional space (i.e., a building where the WLAN 100 is located) that would be required to calculate the position of a fourth point (i.e., rogue AP 60). Since the rogue AP 60 continually transmits beacon signals, the APs 10–30 may continually receive and compile corresponding RSSI data. There is only one point in this three-dimensional space that correlates to all three RSSI data points collected from the rouge AP 60 by the AP 10–30.

It is also possible to use DTOA data to determine the location of the rogue AP 60 by triangulating the distance between the rogue AP 60 and three points of references: the APs 10–30. In addition, or in alternative, the location may determine using the DTOA data along with the calibration data. In step 130, the APs 10–30, either alone or in combination with RSSI data collection, generate DTOA data. The DTOA data may be generated by processing the received beacon signals from the rogue AP 60 and measuring the time that it takes for those beacon signal to arrive at the corresponding APs 10–30. To determine the location of the rogue AP 60 using the DTOA data, at least three reference points are necessary (e.g., APs 10–30).

In step 150, the server 70 analyzes the RSSI and/or DTOA data received from the APs 10–30 and compares to the RSSI data and/or the DTOA data generated during the calibration procedure. The RSSI data and/or DTOA data allow the server 70 to determine the distances between the rogue AP 60 and the corresponding APs 10–30. For example, if the AP 20 records a stronger signal strength value than the AP 30, it may be that the AP 60 is located closer to the AP 20. This determination may be made with additional precision if either or both the AP 20 and the AP 30 use directional antennas.

The RSSI data and/or DTOA data provide the server 70 with sufficient distance data to determine the location of the rogue AP 60 within the WLAN 100. In other words, since the server 70 has the distance data between each AP 10–30 and the rogue AP 60 obtained from the RSSI and/or DTOA data, it can calculate the location of the rogue AP 60 relative to those APs 10–30. One exemplary method for determining the location of the rogue AP 60 is as follows. First, the location of the rogue AP 60 is determined using the RSSI data and the calibration data. Then, the location of the rogue AP 60 is further pinpointed by triangulating with the DTOA data.

The server 70 may then display the results of the calculation on a map of the WLAN 100, e.g. FIG. 1, and overlay the APs 10–30 on the map, since the location of the APs 10–30 is known. The map of the WLAN 100 may be used in conjunction with a physical map of the organization's building (e.g., an architectural blueprint).

The present invention has been described with reference to an embodiment having the WLAN 100 with the APs 10–30, the single rogue AP 60, the one authorized MU 1, and the server 70. One skilled in the art would understand that the present invention may also be successfully implemented, for example, for a plurality of rogue APs, a plurality of APs in a WLAN, etc. Accordingly, various modifications and changes may be made to the embodiments without departing from the broadest spirit and scope of the present invention as set forth in the claims that follow. The specification and drawings are accordingly to be regarded in an illustrative rather than restrictive sense.

What is claimed is:

1. A method for determining a location of an unauthorized wireless access point ("AP") accessing a communication network, comprising:

upon notification of existence of the unauthorized AP, tracking a beacon of the unauthorized AP using at least three authorized APs of the communication network;

generating a tracking data record partially based on information obtained in the tracking step, the tracking record including a location of each of the authorized APs and at least one of (i) a first strength data corresponding to a strength of the tracking beacon as measured by each of the authorized APs and (ii) a first time data corresponding to a time period that it takes for the tracking beacon to arrive at each of the authorized APs; and determining the location of the unauthorized AP as a function of at least one of (i) the tracking record and (ii) a calibrating record, the calibrating record including (a) at least one of a second strength data corresponding to a strength of a calibrating beacon as transmitted from a predetermined location within the communication network and received by each of the authorized APs and a second time data corresponding to a time period that it takes for the calibrating beacon to arrive from the predetermined location to each of the authorized AP, (b) the predetermined location and (c) the location of each of the authorized AP.

2. The method according to claim 1, wherein when the tracking record includes the first strength data, the determining step includes the substep of calculating the location of the unauthorized AP as a function of the first and second strength data.

3. The method according to claim 1, wherein when the tracking record includes the first time data, the determining step includes at least one of (i) the substep of triangulating the precise location of the unauthorized AP using the first time data and (ii) the substep of calculating the location of the unauthorized AP as a function of the first and second time data.

4. The method according to claim 1, further comprising:
before the tracking step, performing a calibration procedure including the following substeps:
placing a calibrating device at a plurality of predetermined locations within the communication network,
tracking the calibrating beacon from the calibrating device using each of the authorized APs, and
generating the calibration record based on data generated in the tracking substep.

5. The method according to claim 1, further comprising:
overlaying a geographical map of the communication network with the location of each of the authorized APs and the results of the determining step.

6. The method according to claim 1, wherein the tracking record includes a MAC address of the unauthorized AP.

7. The method according to claim 1, wherein the tracking step includes the substep of selecting the at least three authorized APs from a plurality of available authorized APs of the communication network as a function of geographical locations of the authorized APs.

8. The method according to claim 1, further comprising:
after the generating step, storing the tracking record in a memory arrangement of each of the authorized APs; and
providing to the tracking record to a computer of the communication network,
wherein the determining step is performed by the computer.

9. A system for determining a location of an unauthorized wireless access point ("AP") accessing a communication network, comprising:

a plurality of authorized APs; and a computing arrangement, wherein upon notification of existence of the unauthorized AP, at least three authorized APs of the plurality of the authorized APs track a beacon of the unauthorized AP, the at least three authorized APs generating a tracking data record which includes a location of each of the authorized APs and at least one (i) a first strength data corresponding to a strength of the tracking beacon as measured by each of the authorized APs and (ii) a first time data corresponding to a time period that it takes for the tracking beacon to arrive at each of the authorized APs, and wherein the computer determines the precise location of the unauthorized AP as a function of the tracking record and a calibrating data record, the calibrating record including (a) at least one of (i) a second strength data corresponding to a strength of a calibrating beacon as transmitted from a predetermined location within the communication network and received by each of the authorized APs and (ii) a second time data corresponding to a time period that it takes for the calibrating beacon to arrive from the predetermined location at each of the authorized APS, (b) the predetermined location and (c) the location of each of the authorized APS.

10. The system according to claim 9, further comprising:
a calibrating device transmitting the calibrating beacon, the calibrating device including a wireless transmitter.

11. The system according to claim 10, wherein the calibrating device is one of a wireless mobile device and an AP.

12. The system according to claim 9, wherein when the tracking record includes the first strength data, the computing arrangement calculates the location of the unauthorized AP as a function of the first and second strength data.

13. The system according to claim 9, wherein when the tracking record includes the first time data, the computing arrangement includes at least one of (i) triangulating the precise location of the unauthorized AP using the first time data and (ii) calculating the location of the unauthorized AP as a function of the first and second time data.

14. The system according to claim 9, wherein the computing arrangement overlays a geographical map of the communication network with the location of each of the authorized APs and the unauthorized AP.

15. The system according to claim 9, wherein the tracking record includes a MAC address of the unauthorized AP.

16. The system according to claim 9, wherein the computing arrangement selects the at least three authorized APs from the plurality of authorized APs to track the unauthorized AP as a function of the location of each of the authorized APs.

17. The system according to claim 9, wherein the tracking record is situated in a memory arrangement of each of the authorized APs, the tracking record being provided to the computing arrangement upon one of (i) an expiration of a predetermined time period and (ii) a request from the computing arrangement.

18. The system according to claim 9, wherein when the computing arrangement determines the existence of the unauthorized AP, the computing arrangement directs the at least three authorized APs to initiate tracking of the beacon of the unauthorized AP.

19. A computing device for determining a location of an unauthorized wireless access point ("AP") accessing a communication network, comprising:

a memory arrangement storing a calibrating data record;

a communication arrangement communicating with the authorized APs; and a processor determining the precise location of the unauthorized AP as a function of at least one of a tracking data record and the calibrating data record, wherein the tracking record is generated by at least three authorized APs of a plurality of authorized APs during tracking of the unauthorized AP, the data record including a location of each of the authorized APs and at least one (i) a first strength data corresponding to a strength of a tracking beacon as measured by each of the authorized APs and (ii) a first time data corresponding to a time period that it takes for the tracking beacon to arrive at each of the authorized APs, and wherein the calibrating record includes (a) at least one of (i) a second strength data corresponding to a strength of a calibrating beacon as transmitted from a predetermined location within the communication network and received by each of the authorized APs and (ii) a second time data corresponding to a time period that it takes for the calibrating beacon to arrive from the predetermined location at each of the authorized APs,(b) the predetermined location and (c) the location of each of the authorized APs.

* * * * *